US009476755B2

(12) United States Patent
Hurmuzlu et al.

(10) Patent No.: US 9,476,755 B2
(45) Date of Patent: Oct. 25, 2016

(54) CALIBRATION TUBE FOR MULTIPHASE FLOWMETERS

(71) Applicant: Southern Methodist University, Dallas, TX (US)

(72) Inventors: Yildirim Hurmuzlu, McKinney, TX (US); Edmond Richer, Richardson, TX (US)

(73) Assignee: Southern Methodist University, Dallas, TX (US)

( * ) Notice: Subject to any disclaimer, the term of this patent is extended or adjusted under 35 U.S.C. 154(b) by 202 days.

(21) Appl. No.: 14/195,384

(22) Filed: Mar. 3, 2014

(65) Prior Publication Data

US 2014/0174146 A1    Jun. 26, 2014

Related U.S. Application Data

(63) Continuation of application No. 13/032,460, filed on Feb. 22, 2011, now Pat. No. 8,701,461.

(51) Int. Cl.
| | |
|---|---|
| *G01N 29/032* | (2006.01) |
| *G01F 25/00* | (2006.01) |
| *G01F 1/66* | (2006.01) |
| *G01F 1/74* | (2006.01) |
| *G01F 15/08* | (2006.01) |

(52) U.S. Cl.
CPC .............. *G01F 25/0007* (2013.01); *G01F 1/66* (2013.01); *G01F 1/74* (2013.01); *G01F 15/08* (2013.01); *G01F 25/00* (2013.01); *G01F 25/0061* (2013.01)

(58) Field of Classification Search
CPC ........ G01F 1/74; G01F 1/7082; G01F 1/667; G01F 25/0007; G01F 1/84; G01F 1/8436; G01F 25/00; G01N 2291/0224; G01N 2291/02433; G01N 33/2823; G01N 2291/105
See application file for complete search history.

(56) References Cited

U.S. PATENT DOCUMENTS

| | | | | |
|---|---|---|---|---|
| 4,236,406 | A * | 12/1980 | Reed | G01F 1/66 73/1.34 |
| 4,760,742 | A * | 8/1988 | Hatton | F17D 1/005 73/200 |
| 5,049,823 | A * | 9/1991 | Castel | G01N 22/04 324/640 |
| 5,224,372 | A * | 7/1993 | Kolpak | G01F 1/74 73/19.03 |
| 5,365,778 | A * | 11/1994 | Sheen | G01N 11/16 73/32 A |
| 5,461,930 | A * | 10/1995 | Farchi | G01F 1/74 73/195 |
| 5,714,691 | A * | 2/1998 | Hill | G01B 5/28 73/861.04 |
| 5,770,805 | A * | 6/1998 | Castel | G01F 1/20 73/861.04 |
| 6,032,539 | A | 3/2000 | Liu et al. | |

(Continued)

OTHER PUBLICATIONS

International Search Report and Written Opinion of KIPO issued Aug. 22, 2012 in connection with International Application No. PCT/US2012/026012.

(Continued)

*Primary Examiner* — David A Rogers
(74) *Attorney, Agent, or Firm* — Edwin S. Flores; Chalker Flores, LLP

(57) ABSTRACT

An automated calibration device that comprises a tube for trapping a multiphase sample between three ultrasound (US) transducer pairs wherein each of the three transducer pairs is positioned to measure a different fraction of the multiphase sample.

15 Claims, 4 Drawing Sheets

(56) References Cited

U.S. PATENT DOCUMENTS

| | | | | |
|---|---|---|---|---|
| 6,155,102 | A * | 12/2000 | Toma | G01F 1/74 434/46 |
| 6,354,147 | B1 * | 3/2002 | Gysling | G01N 29/024 73/579 |
| 6,601,458 | B1 | 8/2003 | Gysling et al. | |
| 6,658,944 | B2 * | 12/2003 | Melnikov | G01F 1/663 73/861.04 |
| 6,817,229 | B2 * | 11/2004 | Han | E21B 47/101 73/152.47 |
| 6,898,541 | B2 | 5/2005 | Gysling et al. | |
| 7,380,438 | B2 * | 6/2008 | Gysling | G01N 22/00 702/24 |
| 7,587,290 | B2 * | 9/2009 | Scott | G01N 33/28 702/100 |
| 7,681,444 | B2 * | 3/2010 | Raskie | E21B 47/10 73/200 |
| 2004/0199340 | A1 * | 10/2004 | Kersey | G01F 1/662 702/50 |
| 2004/0255695 | A1 * | 12/2004 | Gysling | G01F 1/7082 73/862 |
| 2005/0061060 | A1 * | 3/2005 | Gysling | G01F 1/74 73/32 A |
| 2005/0193832 | A1 * | 9/2005 | Tombs | G01F 1/74 73/861 |
| 2005/0210965 | A1 * | 9/2005 | Sinha | G01N 29/036 73/61.79 |
| 2008/0163692 | A1 * | 7/2008 | Huang | G01F 1/663 73/627 |
| 2009/0000390 | A1 | 1/2009 | Duhanyan et al. | |
| 2010/0251829 | A1 * | 10/2010 | Davis | G01F 1/667 73/861.28 |
| 2010/0257931 | A1 | 10/2010 | Partington et al. | |
| 2010/0268487 | A1 | 10/2010 | Hurmuzlu et al. | |
| 2010/0274503 | A1 * | 10/2010 | Hurmuzlu | G01F 1/74 702/48 |
| 2010/0299088 | A1 * | 11/2010 | Huang | G01F 1/667 702/48 |
| 2012/0055239 | A1 * | 3/2012 | Sinha | G01N 29/024 73/61.79 |

OTHER PUBLICATIONS

International Preliminary Report on Patentability Issued Aug. 27, 2013 in connection with International Application No. PCT/US2012/026012.

* cited by examiner

CALIBRATION TUBE FOR MULTIPHASE FLOWMETERS

CROSS-REFERENCE TO RELATED APPLICATIONS

This application is a continuation of U.S. Ser. No. 13/032,460 filed on Feb. 22, 2011, entitled Calibration Tube for Multiphase Flowmeters, the entire contents of which is incorporated herein by reference.

TECHNICAL FIELD OF THE INVENTION

The present invention relates in general to the field of multiphase flowmeters, and more particularly, to the design and use of a device for the automated calibration of a multiphase flowmeter.

STATEMENT OF FEDERALLY FUNDED RESEARCH

None.

BACKGROUND OF THE INVENTION

Without limiting the scope of the invention, its background is described in connection with multiphase flow measurement devices and methods.

U.S. Pat. No. 6,032,539 issued to Liu and Rieken (2000) provides an apparatus for separating at least a first component (e.g., liquid, etc.) from a second component (e.g, gas or vapor, etc.) from a multiphase fluid during non-ideal flows such as plug flow operation. The apparatus of the Liu invention generally has a first line section tangentially connected to the inlet flow line and a second line section coupled in series to the first line section. The second line section includes an upper portion and a lower portion, which are respectively coupled to an upper portion and a lower portion of the first line section. The first component is removed using a gas discharge line connected to the second line section. A substantially horizontal line section also connected to second line section removes substantially liquids from the second line section.

U.S. Patent Application No. 20090000390 (Duhanyan and Roux, 2009) describe a flow rate measuring method for a multiphase fluid mixture (FM) flowing into a line (LN), the fluid mixture (FM) comprising at least a first and a second phase, the method comprising the steps of: passing the fluid mixture through a Venturi tube in which the fluid mixture is subjected to a pressure drop, continuously measuring by means of said Venturi tube permanently installed on the line a differential pressure across the Venturi tube $\Delta P_v$ and a line pressure of the fluid mixture in the line $P_i$, punctually measuring at a determined instant by means of a second measuring device removeably installed on the line at least one measured parameter of the fluid mixture correlated to the first phase quantity relatively to the second phase quantity, continuously determining at least one estimated parameter of the fluid mixture correlated to the first phase quantity relatively to the second phase quantity based on the punctually measured parameter and an extrapolating scheme, and determining at least one phase flow rate based on the differential pressure across the Venturi ($\Delta P_v$), the line pressure of the fluid mixture into the line $P_i$ and the at least one measured parameter of the fluid mixture when the second device is installed on the line, and determining at least one phase flow rate based on the differential pressure across the Venturi ($\Delta P_v$), the line pressure of the fluid mixture into the line $P_i$ and the at least one estimated parameter of the fluid mixture when the second device is removed from the line.

SUMMARY OF THE INVENTION

The present invention describes an automated calibration device for multiphase flowmeters. The device determines the gas volumetric fraction, the water cut, and the densities of the gas phase and oil fraction.

One embodiment of the instant invention discloses an automated calibration device for a multiphase flowmeter, wherein the calibration device is placed vertically and comprises: (i) a tube for holding a liquid multiphase sample, wherein the tube comprises two or more valves for trapping the multiphase sample; (ii) a temperature sensor; (iii) a pressure sensor; and (iv) three ultrasound transducers positioned at one or more specific locations in or around the tube, wherein the transducers comprise a bottom/transversal (BT) pair, a top/transversal (TT) pair, and a longitudinal ($L_T L_B$) pair. In one aspect the multiphase sample in the tube comprises at least one liquid phase. More specifically, the liquid phase is water. In another aspect the multiphase sample comprises at least one gaseous phase. In yet another aspect the two or more phases in the calibration device have different acoustic impedances. In one aspect the BT pair measures an ultrasound velocity in the liquid phase. In another aspect the TT pair measures an ultrasound velocity in the gaseous phase. In yet another aspect the $L_T L_B$ pair measures an ultrasound velocity in the multiphase mixture.

Another embodiment disclosed herein provides a method for calibrating a multiphase flowmeter comprising the steps of: providing the multiphase flowmeter, providing a vertically placed calibration device comprising: a) a tube for holding a liquid multiphase sample, wherein the multiphase sample comprises at least one liquid phase and at least one gas phase, wherein the liquid phase is water, b) a temperature sensor, c) a pressure sensor, and d) three ultrasound transducers positioned at one or more specific locations in or around the tube, wherein the transducers comprise a bottom/transversal (BT) pair, a top/transversal (TT) pair, and a longitudinal ($L_T L_B$) pair; trapping the multiphase liquid sample in the tube of the calibration device; allowing the trapped multiphase sample to separate into two or more component phases; measuring an ultrasound velocity (UV) in the water by using the BT pair of ultrasound transducers; measuring the UV in the gas by using the TT pair of ultrasound transducers, wherein the step of measuring the UV in the gas and in the water may be performed simultaneously; calculating an ultrasound propagation velocity for gas ($UV_g$) and water ($UV_w$); measuring the UV in the mixture ($UV_m$) by using the $L_T L_B$ pair of ultrasound transducers, wherein the $L_T L_B$ pair of ultrasound transducers are operated in a transmission mode; obtaining a gas volume by using the $L_T$ in a reflection mode and combining it with the $UV_g$; obtaining a water volume by using the $L_B$ in the reflection mode and combining it with the $UV_w$; and calibrating the multiphase flowmeter by verifying and adjusting the gas volume and the water volume with the result for the UV in the mixture.

In one aspect of the method the liquid sample is trapped in the tube by two valves. In another aspect the two or more phases in the calibration device have different acoustic impedances.

Yet another embodiment of the instant invention relates to a method of calibrating a multiphase flowmeter comprising the steps of: a) providing the multiphase flowmeter; providing a calibration device, wherein the calibration device is placed vertically and comprises: (i) a tube for holding a liquid multiphase sample, wherein the multiphase sample comprises water, a gas, and an oil; (ii) a temperature sensor; (iii) a pressure sensor; and (iv) three ultrasound transducers positioned at one or more specific locations in or around the tube, wherein the transducers comprise a bottom/transversal (BT) pair, a top/transversal (TT) pair, and a longitudinal ($L_T L_B$) pair; b) trapping the multiphase liquid sample in the tube of the calibration device; c) allowing the trapped multiphase sample to separate into two or more component phases; d) measuring an ultrasound velocity (UV) in the water by using the BT pair of ultrasound transducers; e) measuring the UV in the gas by using the TT pair of ultrasound transducers, wherein the step of measuring the UV in the gas and in the water may be performed simultaneously; f) calculating an ultrasound propagation velocity for gas ($UV_g$) and water ($UV_w$); g) measuring the UV in the mixture ($UV_m$) by using the $L_T L_B$ pair of ultrasound transducers, wherein the $L_T L_B$ pair of ultrasound transducers are operated in a transmission mode; g) obtaining a gas volume by using the $L_T$ in a reflection mode and combining it with the $UV_g$; h) obtaining a water volume by using the $L_B$ in the reflection mode and combining it with the $UV_w$; and i) calibrating the multiphase flowmeter by verifying and adjusting the gas volume and the water volume with the result for the UV in the mixture.

The method as described hereinabove further comprises the steps of: measuring an ultrasound propagation velocity in the oil ($UV_o$) from the measurement of the $UV_m$; measurement of a gas volumetric fraction; and measurement of a water-cut (WC). In one aspect of the method the water phase and an oil phase in the calibration device have different acoustic impedances.

In one embodiment the instant invention describes a device for determination of densities of a gas fraction and an oil fraction in a multiphase sample comprising water-oil-gas comprising: a vertical tube for holding the multiphase sample, wherein the tube comprises two or more valves for trapping the multiphase sample; a temperature sensor; a pressure sensor; and three ultrasound transducers positioned at one or more specific locations in or around the tube, wherein the transducers comprise a bottom/transversal (BT) pair, a top/transversal (TT) pair, and a longitudinal ($L_T L_B$) pair. In one aspect of the method the water fraction and the oil fraction in the device have different acoustic impedances.

Another embodiment disclosed herein relates to a method for measuring densities of a gas fraction and an oil fraction in a multiphase sample comprising water-oil-gas comprising the steps of: providing a multiphase flowmeter; providing a measuring device, wherein the measuring device is placed vertically and comprises: a) a tube for holding the multiphase sample, wherein the tube comprises two or more valves for trapping the multiphase sample; b) a temperature sensor; c) a pressure sensor; and d) three ultrasound transducers positioned at one or more specific locations in or around the tube, wherein the transducers comprise a bottom/transversal (BT) pair, a top/transversal (TT) pair, and a longitudinal ($L_T L_B$) pair; trapping the sample in the tube of the measuring device; allowing the trapped sample to separate into its component phases; calculating a density and an acoustic impedance of water at a current temperature and pressure, wherein a temperature and pressure measurement is obtained using the temperature and pressure sensor; operating the $L_T L_B$ transducer pair in a reflection mode to determine a reflection coefficient at a water/oil ($R_{w/o}$) and a gas/oil ($R_{g/o}$) interface, wherein the reflection coefficient is obtained as an amplitude ratio between one or more emitted and received signals; and determining an acoustic impedance and a density of the oil and the gas from a measurement of the $R_{w/o}$ and $R_{g/o}$. In one aspect of the method the water fraction and the oil fraction in the device have different acoustic impedances.

BRIEF DESCRIPTION OF THE DRAWINGS

For a more complete understanding of the features and advantages of the present invention, reference is now made to the detailed description of the invention along with the accompanying figures and in which.

DETAILED DESCRIPTION OF THE INVENTION

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention.

To facilitate the understanding of this invention, a number of terms are defined below. Terms defined herein have meanings as commonly understood by a person of ordinary skill in the areas relevant to the present invention. Terms such as "a", "an" and "the" are not intended to refer to only a singular entity, but include the general class of which a specific example may be used for illustration. The terminology herein is used to describe specific embodiments of the invention, but their usage does not delimit the invention, except as outlined in the claims.

Figure 1:
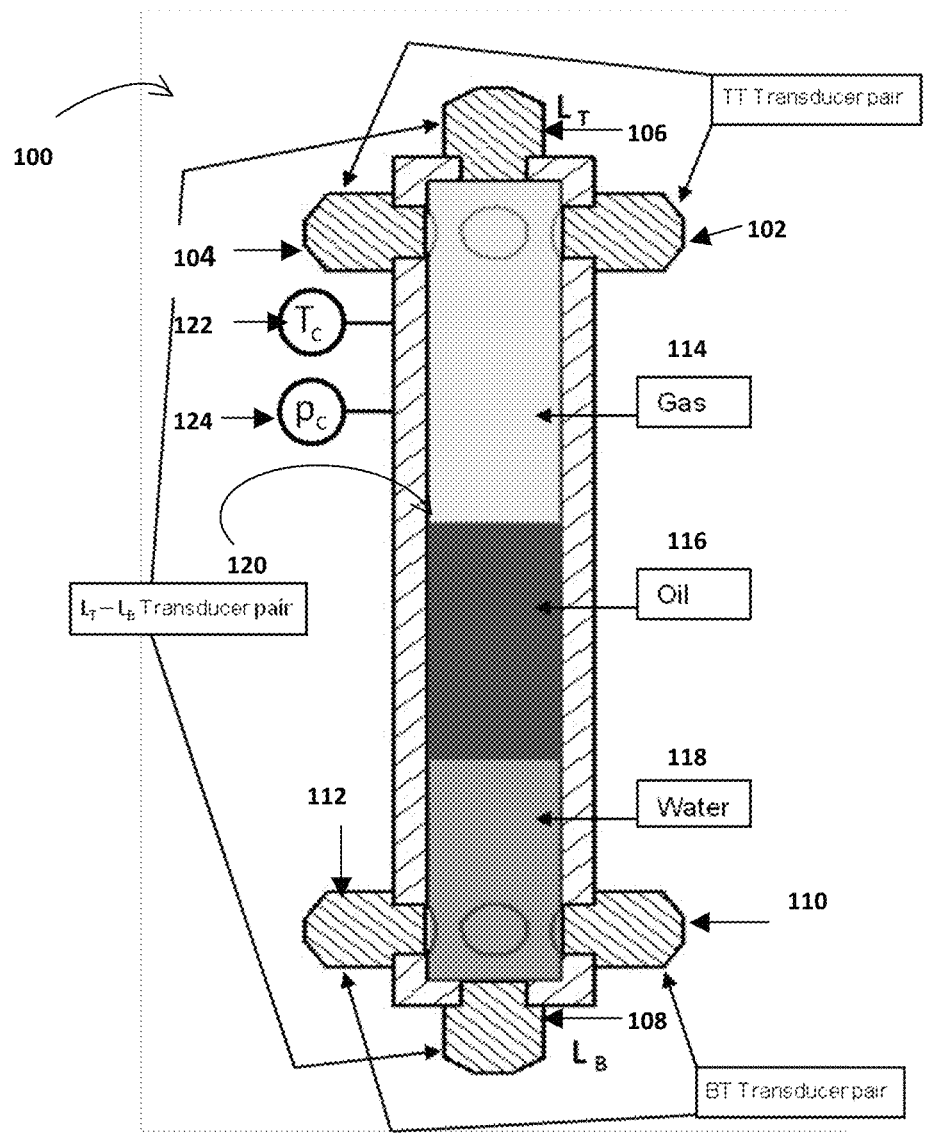
FIG. 1 shows the calibration device of the present invention showing separated mixture inside the device's body and the placement of the ultrasound transducer pairs.

The present invention discloses an automated calibration device for multiphase flowmeters. The device 100 of the present invention as shown in FIG. 1 is placed vertically and comprises a tube 120 with vertical longitudinal axis that traps a sample of the liquid using two valves. The device comprises a temperature sensor 122, a pressure sensor 124, and three pairs (102-112) of ultrasound transducers that are positioned in a specific manner: (i) bottom/transversal (BT) (110 and 112) for water, (ii) top/transversal (TT) (102 and 104) for gas, and (iii) a longitudinal pair ($L_T$-$L_B$) one on top ($L_T$) 106 and one on bottom ($L_B$) 108 to measure the total volume. Once the three phases 114, 116, and 118 of the liquid separate, the ultrasound transmitters are used to determine the phase fractions of each phase.

Figure 2:
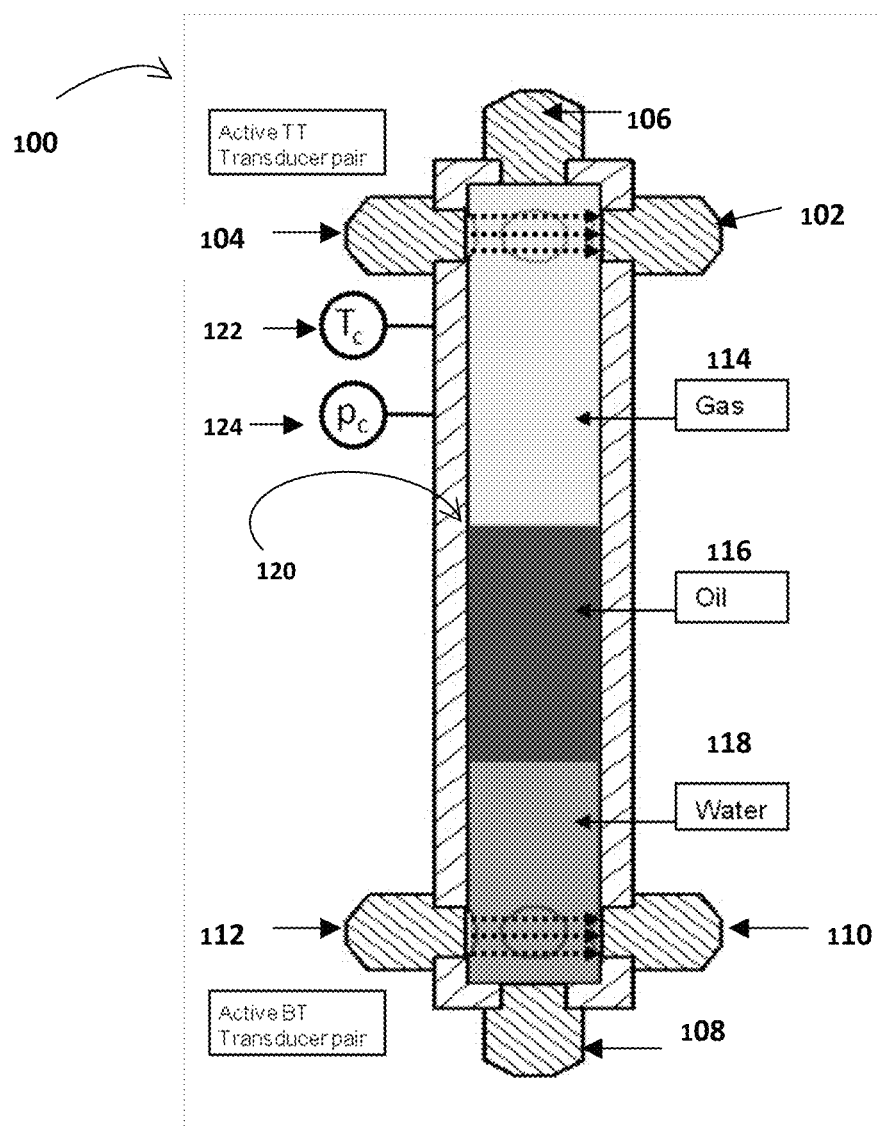
FIG. 2 shows the calibration device of the present invention with the top/transversal (TT) and bottom/transversal (BT) transducer pairs operating in transmission mode.

The automated calibration method using the device of the present invention is described herein. To begin the calibration device is placed vertically. The multiphase mixture is trapped in the tube and allowed to separate. Then the bottom/transversal (BT) pair 110 and 112 of ultrasound transducers are used to measure ultrasound velocity in water ($UV_w$). This is followed by the step of using the top/transversal (TT) pair 102 and 104 of ultrasound transducers to measure ultrasound velocity in gas ($UV_g$). These two steps can be performed simultaneously as shown in FIG. 2. The ultrasound propagation velocity for gas and water are calculated as follows:

$$UV_g = t_g/D_d \quad (1)$$

and $$UV_w = t_w/D_d \quad (2)$$

where, $t_g$ and $t_w$ are the measured propagation times of ultrasound pulses through gas and water respectively, and $D_d$ is the diameter of the device.

Figure 3:
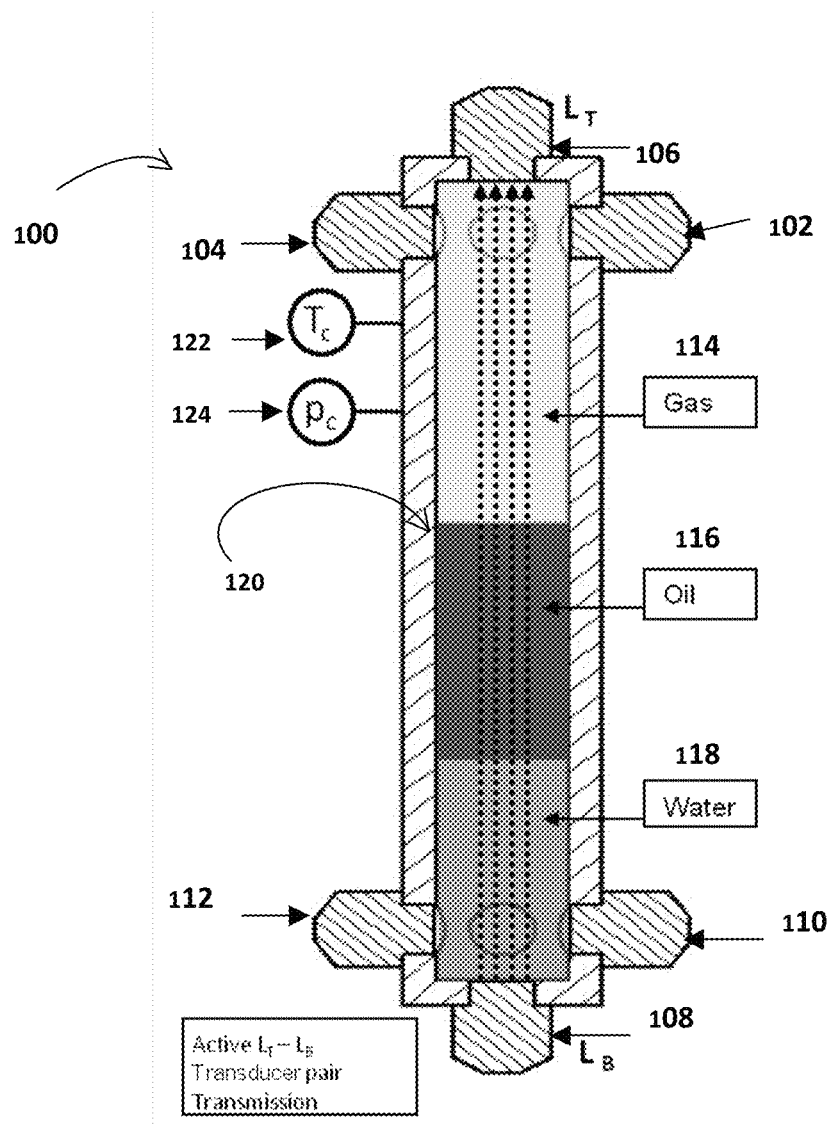
FIG. 3 shows the calibration device of the present invention with the longitudinal ($L_T$-$L_B$) transducer pair operating in transmission mode.

The longitudinal ($L_T$-$L_B$) pair 106 and 108 of ultrasound transducers is used in transmission mode (FIG. 3) to measure UV through the mixture:

$$UV_m = t_{lm}/L_d \quad (3)$$

where, $t_{lm}$ is the measured propagation time of ultrasound pulses along the longitudinal direction of the device, and $L_d$ is the length of the device.

Figure 4:
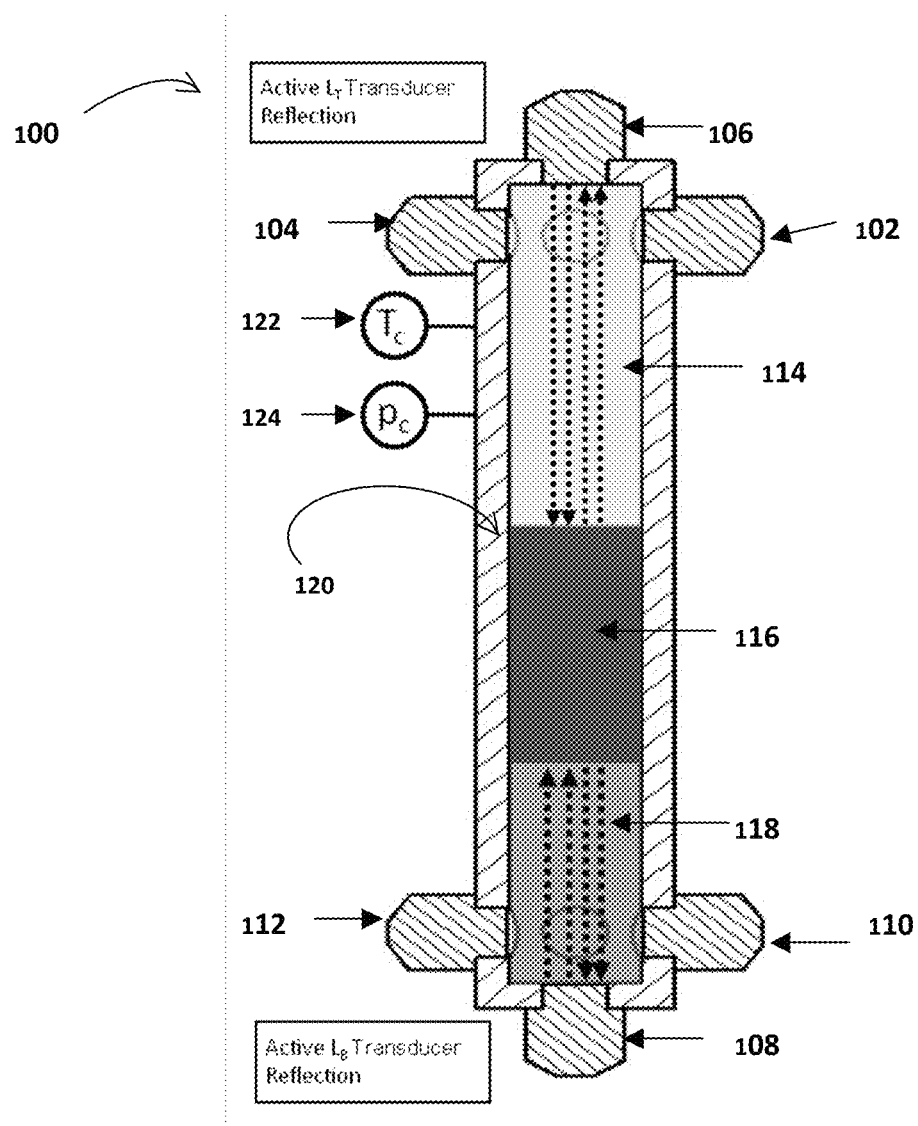
FIG. 4 shows the calibration device of the present invention with the longitudinal $L_T$ $_{and}$ $L_B$ transducers operating in reflection mode.

By using the $L_T$ in reflection mode and $UV_g$ from the TT measurement one can obtain the height of the gas volume $h_g$:

$$h_g = t_{lg} UV_g / 2 \quad (4)$$

where, $t_{lg}$ is the measured propagation time of ultrasound pulses through the gas fraction along the longitudinal direction of the device. Similarly one can use the $L_B$ 108 in reflection mode and result from the BT measurement to get the height of the water volume (FIG. 4):

$$h_w = t_{lw} UV_m / 2 \quad (5)$$

Ultrasound propagation velocity through oil is obtained using the results from the total measurement (i.e., of the mixture):

$$UV_o = \frac{L_d - (h_g + h_w)}{t_m - \frac{t_{lg} + t_{lw}}{2}} \quad (6)$$

The final step involves determining the gas volumetric fraction (GVF) and the water cut (WC):

$$GVF = \frac{h_g}{L_d} \times 100 \; (\%) \text{ and} \quad (7)$$

$$WC = \frac{h_w}{L_d - h_g} \times 100 \; (\%) \quad (8)$$

The calibration device can be used to determine the densities of the gas and oil fractions as follows:

1. Based on the temperature and pressure measurements provided by the sensors 122 and 124 determine the density and the acoustic impedance of water at the current and temperature and pressure conditions:

$$\rho_w = [\rho_{w0}/(1+\beta(T_c-T_0))]/[1-(p_c-p_0)/E](Kg/m^3) \quad (9)$$

where $\rho_w$, and $\rho_{w0}$ are the water densities at the current ($T_c$, $p_c$) and standard ($T_0$, $p_0$) temperature (° C.) and pressure (Pa) conditions, respectively; $\beta=0.0002$ (m³/m³° C.) is the water volumetric temperature coefficient; $E=2.15 \; 10^9$ (N/m²) is the bulk modulus fluid elasticity for water. The acoustic impedance for water is obtained using:

$$Z_w = \rho_w UV_w \quad (10)$$

2. Using the $L_B$ (108) and $L_T$ (106) transducers in reflection mode determine the reflection coefficients at the water/oil ($R_{w/o}$) and gas/oil ($R_{g/o}$) interfaces as the amplitude ratios between the emitted and received signals.

3. Determine the acoustic impedance and the density of the oil:

$$Z_o = \frac{Z_w(1-R_{w/o})}{(1+R_{w/o})} \text{ and} \quad (11)$$

$$\rho_o = Z_o/UV_o \; (Kg/m^3) \quad (12)$$

4. Determine the acoustic impedance and the density of the gas phase:

$$Z_g = \frac{Z_o(1-R_{g/o})}{(1+R_{g/o})} \text{ and} \quad (13)$$

$$\rho_g = Z_g/UV_g \; (Kg/m^3) \quad (14)$$

It will be understood by persons skilled in the art that the multiphase sample for example can comprise two liquids and a gas (as regularly seen in oil industry applications). The method of the present invention would be applicable in this case provided the two liquids have different acoustic impedances. It will be understood that the use of water and oil as disclosed herein is a non-limiting example and the device and methods described herein can be applied to any set of fluids with different acoustic impedances across different industries.

It is contemplated that any embodiment discussed in this specification can be implemented with respect to any method, kit, reagent, or composition of the invention, and vice versa. Furthermore, compositions of the invention can be used to achieve methods of the invention.

It will be understood that particular embodiments described herein are shown by way of illustration and not as limitations of the invention. The principal features of this invention can be employed in various embodiments without departing from the scope of the invention. Those skilled in the art will recognize, or be able to ascertain using no more than routine experimentation, numerous equivalents to the specific procedures described herein. Such equivalents are considered to be within the scope of this invention and are covered by the claims.

All publications and patent applications mentioned in the specification are indicative of the level of skill of those skilled in the art to which this invention pertains. All publications and patent applications are herein incorporated by reference to the same extent as if each individual publication or patent application was specifically and individually indicated to be incorporated by reference.

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device, the method being employed to determine the value, or the variation that exists among the study subjects.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AB, BBC, AAABCCCC, CBBAAA, CABABB, and so forth. The skilled artisan will understand that typically there is no limit on the number of items or terms in any combination, unless otherwise apparent from the context.

All of the compositions and/or methods disclosed and claimed herein can be made and executed without undue experimentation in light of the present disclosure. While the compositions and methods of this invention have been described in terms of preferred embodiments, it will be apparent to those of skill in the art that variations may be applied to the compositions and/or methods and in the steps or in the sequence of steps of the method described herein without departing from the concept, spirit and scope of the invention. All such similar substitutes and modifications apparent to those skilled in the art are deemed to be within the spirit, scope and concept of the invention as defined by the appended claims.

REFERENCES

U.S. Pat. No. 6,032,539: Multiphase Flow Measurement Method and Apparatus.

U.S. Patent Application No. 20090000390: Method and Apparatus for Measuring the Flow Rates of the Individual Phases of A Multiphase Fluid Mixture.

What is claimed is:

1. An automated calibration device for a multiphase flowmeter, wherein the calibration device is placed vertically and comprises:
    a tube for holding a liquid multiphase sample, wherein the tube comprises two or more valves for trapping the multiphase sample;
    a temperature sensor;
    a pressure sensor; and
    three ultrasound transducer pairs positioned at one or more specific locations in or around the tube, wherein the three transducer pairs comprise:
    a bottom/transversal (BT) pair at the bottom of the tube that is positioned to measure a liquid phase of the multiphase sample;
    a top/transversal (TT) pair at the top of the tube that is positioned to measure a gas phase of the multiphase sample; and
    a longitudinal (LTLB) pair that is positioned transverse to the BT and TT pairs and that measures across the gas phase and the liquid phase of the multiphase sample.

2. The device of claim 1, wherein the multiphase sample comprises at least one liquid phase.

3. The device of claim 2, wherein the liquid phase is water.

4. The device of claim 1, wherein the multiphase sample comprises at least one gaseous phase.

5. The device of claim 1, wherein the two or more phases in the calibration device have different acoustic impedances.

6. The device of claim 1, wherein the BT pair measures an ultrasound velocity in the liquid phase.

7. The device of claim 1, wherein the TT pair measures an ultrasound velocity in the gaseous phase.

8. The device of claim 1, wherein the LTLB pair measures an ultrasound velocity in the multiphase mixture.

9. A device for determination of densities of a gas fraction and an oil fraction in a multiphase sample comprising water-oil-gas comprising:
    a vertical tube for holding the multiphase sample, wherein the tube comprises two or more valves for trapping the multiphase sample;
    a temperature sensor;
    a pressure sensor; and
    a bottom/transversal (BT) pair at the bottom of the tube that is positioned to measure a liquid phase of the multiphase sample,
    a top/transversal (TT) pair at the top of the tube that is positioned to measure a gas phase of the multiphase sample, and
    a longitudinal (LTLB) pair that is positioned transverse to the BT and TT pairs and that measures across the gas phase and the liquid phase of the multiphase sample.

10. The device of claim 9, wherein the water fraction and the oil fraction in the device have different acoustic impedances.

11. A method of calibrating a multiphase flowmeter comprising the steps of:
    providing the multiphase flowmeter; and
    providing a calibration device, wherein the calibration device is placed vertically and comprises: a tube for holding a liquid multiphase sample, wherein the multiphase sample comprises water, a gas, and an oil; a temperature sensor; a pressure sensor; and three ultrasound transducers positioned at one or more specific locations in or around the tube, wherein the transducers comprise a bottom/transversal (BT) pair, a top/transversal (TT) pair, and a longitudinal (LTLB) pair;
    wherein the calibration device functions by:
    trapping the multiphase liquid sample in the tube of the calibration device;
    allowing the trapped multiphase sample to separate into two or more component phases;
    measuring an ultrasound velocity (UV) in the water by using the BT pair of ultrasound transducers;
    measuring the UV in the gas by using the TT pair of ultrasound transducers, wherein the step of measuring the UV in the gas and in the water may be performed simultaneously;
    calculating an ultrasound propagation velocity for gas (UVg) and water (UVw);
    measuring the UV in the mixture (UVm) by using the LTLB pair of ultrasound transducers, wherein the LTLB pair of ultrasound transducers are operated in a transmission mode;
    obtaining a gas volume by using the LT in a reflection mode and combining it with the UVg;
    obtaining a water volume by using the LB in the reflection mode and combining it with the UVw; and
    calibrating the multiphase flowmeter by verifying and adjusting the gas volume and the water volume with the result for the UV in the mixture.

12. The method of claim 11, wherein the method further comprises the step of measuring an ultrasound propagation velocity in the oil (UVo) from the measurement of the UVm.

13. The method of claim 11, wherein the method further comprises the step of measuring a gas volumetric fraction.

14. The method of claim 11, wherein the method further comprises the step of measuring a water-cut (WC).

15. The method of claim 11, wherein a water phase and an oil phase in the calibration device have different acoustic impedances.

* * * * *